Oct. 28, 1958  H. J. FELDHAKE  2,857,674
PROTRACTOR, COMPASS AND RULER
Filed July 27, 1954
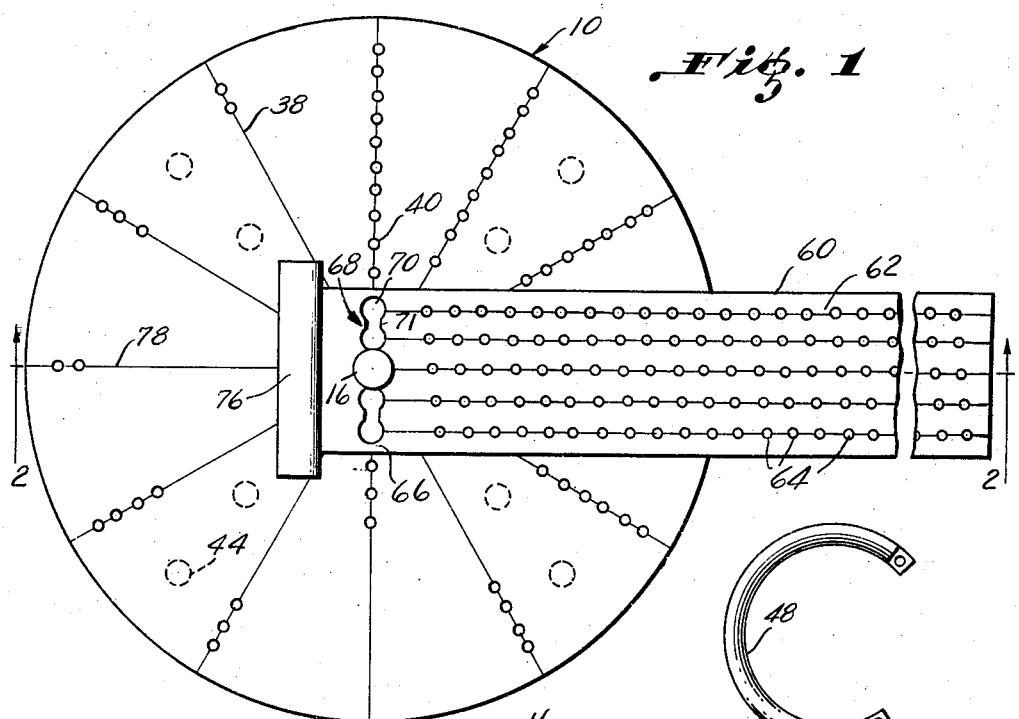
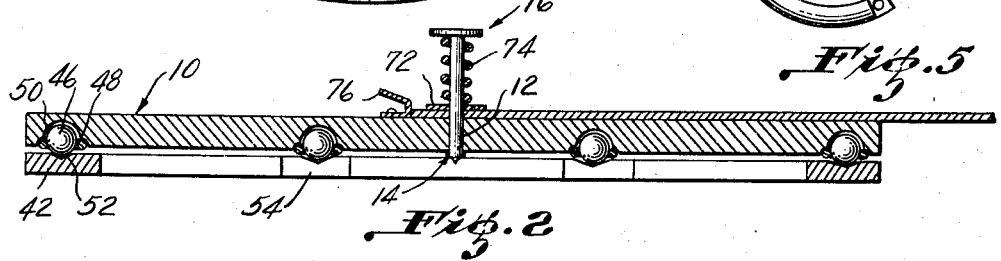
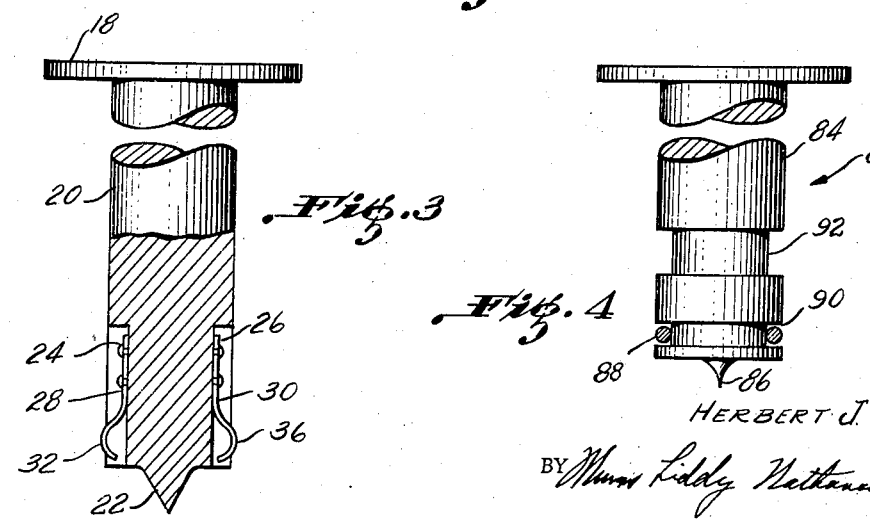
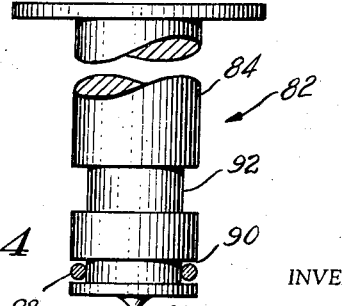
INVENTOR
HERBERT J. FELDHAKE
BY
ATTORNEY United States Patent Office 2,857,674
Patented Oct. 28, 1958

2,857,674

PROTRACTOR, COMPASS AND RULER

Herbert J. Feldhake, Norman, Okla.

Application July 27, 1954, Serial No. 446,121

5 Claims. (Cl. 33—27)

This invention relates to drafting devices and particularly to a combination protractor, compass and ruler.

An object of this invention is to provide a drafting instrument which can be used as a protractor, which can also be used as a compass, and which incorporates a ruler.

Yet a further object of this invention is to provide a compass protractor which can rest on a board or paper for the purpose of striking off an angle, for example, yet which can be raised from the board or paper when it is used to inscribe a circle. Still another object of the invention is to provide a protractor compass raised from the surface of a board with which the complete area of the compass and protractor is useable for inscribing a circle.

Still another object is to provide an attachable extension device for extending the range of the compass. The objects include the provision of a simple means for attaching and removing the extension, means for retaining the extension in a fixed position. The objects further include providing an adjustable center column to be used as a center point which is cooperable with the extension for retaining the latter in position, which can be moved to varying positions, and which can be removed from the protractor. The center point serves as a center for the compass, protractor and for the extension. The objects also include the provision of scales of convenient form.

These and other objects and advantages will become apparent from the following description and the accompanying drawings in which:

Figure 1 is a plan view of the protractor and compass constructed in accordance with the invention.

Figure 2 is a sectional view taken along line 2—2 of Fig. 1.

Figure 3 is an enlarged fragmentary view of a center pin constructed in accordance with the invention.

Figure 4 is a view similar to Fig. 3 showing another form of center pin.

Figure 5 is a plan view of a clamping ring forming part of the invention.

Similar reference characters represent similar parts in the several figures.

The present invention was developed in order to provide a simple, compact, yet reliable means of striking off angles and drawing scales. Among the objects of the invention are to provide an instrument particularly useful in kits that may be transported from place to place in the making of drawings. Although a drafting machine may be of a desirable instrument at a fixed drawing board it is not possible to carry such an instrument around and set it up for use wherever needed. The instant invention relates to light portable instrument which will meet all the needs insofar as the drawing of circles and the striking of arcs is concerned. The objects further include providing an instrument that has means insuring accuracy, such as required in the making of drawings. Furthermore, the range of the instrument is highly satisfactory. Although a single plate-like member can be used as a compass and protractor there are no "blind spots" in which circles cannot be drawn. The device can be elevated above the surface of a board for facilitating the drawing of a circle. Furthermore, the device can be placed closely adjacent the surface of a board for striking off arcs.

Other objects are to provide a protractor-compass with an attachable extension in the form of a ruler which will increase the range of the instrument and which can be used independently; to provide a simple means for securely positioning the ruler on the compass; to provide a center point structure cooperable with the ruler and compass and functioning to position the ruler; and to provide the means facilitating rotation of the compass protractor.

These and other objects and advantages will become apparent from the following description and the accompanying drawings in which:

Referring now particularly to the drawings the instrument comprises a circular plate 10. An opening 12 extends laterally of the plate at the center 14. Pin 16 is received within this opening and constitutes a center pin. The pin has a head 18, a body 20 and a point 22. At its lower end the body is recessed at spaced points 24 and 26. Spring members 28 and 30 are secured in the recesses and have curved spring arms 32 and 36 which project outwardly beyond the perimeter of the cylindrical body 20 and are adapted to frictionally engage in the opening 12. The center pin may be moved through the opening upon depressing the spring arms 32, 36. The pin can be removed from above. The pin can also be moved downwardly through the opening until the point 22 projects beyond the plate 10. When in this position point 22 serves as a center point for the plate 10. The plate is provided with radially extending score lines 38. Openings 40 extend through the plate at spaced points along the score lines. These openings are positioned at fixed distances from the center. By using a number of openings on different score lines openings can be provided every fraction of an inch. For example, by using a number of score lines the openings can be positioned on 64th inch distances from the center, thus giving a choice of drawing circles spaced a 64th of an inch apart. These openings are of sufficient size to receive a pencil point.

Figure 2 illustrates a cross sectional view of the plate 10 and a supporting device 42. The vertical dimensions of the members 10 and 42 can be less than those shown in Fig. 2. However, the thickness shown is chosen for clarity of showing. Plate 10 has spaced openings 44. These openings are arranged in two concentric circles which are concentric with the center of the plate. The openings are spaced 90° from each other. As seen in Fig. 2 rollers 46 are received in each of the openings. Circular clamping rings 48 are received in grooves 50 and retain the rollers within the spaced openings. The rollers can freely rotate in the openings and serve as a means for rotating the plate 10 upon a board or paper with the plate spaced from the board. This eliminates smearing of work which has been placed on the board prior to the inscribing of a circle, for example. As stated above, plate 10 can be thinner than shown and the rollers can project upwardly above the plate through openings provided for that purpose. It is necessary, of course, that the openings be smaller than the rollers.

Figure 2 also illustrates the use of a cooperating runway 52 formed in the circular supporting device 42. The latter consists of a ring-like member having a flat lower surface and the track 52 formed in the upper surface thereof. Track 52 is adapted to receive the outer circle of rollers 46. When the rollers 46 in the outer circle are supported on track 42 the protractor can be rotated very easily on the track. Further, the central position of the pivot center for the protractor is easy to maintain. As an alternative a circular support device 54 can be used in cooperation with the center group of rollers. The protractor is mounted either on ring 42 or ring 54. When on ring 54 the openings 40 radially equidistant from the center 14 with respect to the outer circle or ring of rollers 46 can be used.

Ruler 60 has a series of spaced score lines 62. Spaced openings 64 are positioned along the score lines in the same manner as on plate 10. By using a number of lines these openings can be positioned at a distance of a 64th of an inch from base line 66. A lateral channel 68 extends through the ruler at the base line 66. This channel is formed of a series of circular openings 70 and slots 71. These circular openings are adapted to receive pin 16. Pin 16 can be removed from the plate 10, the ruler positioned and the pin moved downwardly thru one of the openings 70 and opening 14. Washer 72 is urged against the upper surface of the ruler by springs 74 when the pin is in normal position. Bracket 76 is positioned adjacent the central opening 14. The bracket can have some resiliency and may be termed a spring, and can be attached to the plate by rivets or any suitable means. Bracket 76 extends laterally of line 78 which is in alinement with the score line of ruler 60 and is positioned adjacent the center point. The bracket is also positioned so that ruler 60 will be urged toward the side of the center pin. The ruler 60 is always maintained in a position such that the score line which happens to be alined with the center pin at the base line extends radially of plate 10. The openings on these score lines can be used to draw circles.

Channel 68 is formed by spaced openings 70 and connected slots 71. These slots when used in conjunction with a pin, such as 82, serve as 16 or a ready means for facilitating alinement of score lines 62 with the center of plate 10.

Pin 82 is seen to have a cylindrical body 84, a point 86 and a compressible ring 88 received in a circular slot or groove 90. This ring is resilient and serves instead of the spring fingers 28 and 30 seen in Fig. 3. This ring can be the same as or substantially identical with the ring 48. Pin 82 is further provided with a reduced cylindrical portion 92. This reduced portion is of slightly smaller diameter than the width of the slots 71. It is seen that when pin 82 is raised to a proper position the ruler 60 can be slid along the face of the plate 10 without complete removal of the pin. This facilitates alinement of the template and makes it unnecessary to realign the pin with the hole in the plate and a hole in the ruler each time the ruler is moved.

While I have shown and described a preferred form of my invention, it will be understood that variations in details of form may be made without departure from the invention as defined in the appended claims.

I claim:

1. A drawing instrument comprising a plate having an opening extending through said plate, a center pin slidably positioned in said opening, a ruler, said ruler having a series of openings of a size complementary to said pin, said openings being alined laterally of said ruler and being parallel to one end of said ruler at a fixed distance therefrom with said pin being inserted through one of the last named series of openings and being insertible in any one of said openings and extending through said ruler, said pin being positioned a fixed distance from one end of said ruler, a spring bracket fixed to said plate and having a substantially flat surface extending parallel to a diametrical line through the opening in said plate and positioned a distance from the last named opening equal to the distance of the openings in the ruler from said one end of the ruler, said spring bracket urging said ruler against said pin.

2. A drafting instrument comprising a plate, said plate having a center opening extending therethrough, a center pin slidably positioned in said opening, said center pin being removable from said opening, spring means engaged with the sides of said opening and operating to resist sliding movement of said pin in said opening, a ruler positioned on said plate, said ruler having a series of spaced openings of a size complementary to said pin, the last-named openings being alined laterally of said ruler and parallel to one end thereof and positioned a fixed distance from said one end of said ruler, said pin being positioned in one of the last named openings, spring means fixed to said plate and bearing against said one end of said ruler and urging said ruler towards said pin.

3. A drafting instrument comprising a plate, roller means mounted in the base of said plate and projecting below said plate for facilitating rotation of said plate, a center pin slidably received in an opening in said plate at the center thereof, said pin being projectable below said plate to form a pivot center for rotation of said instrument about a fixed point by sliding movement of said pin in said plate within said opening, said opening extending through said plate, said center pin being removable through sliding movement of said pin with respect to said plate outwardly of said plate, a ruler positioned on said plate parallel to the upper surface thereof, said ruler having an opening therein formed complementarily to said pin and pivotally receiving said pin within said opening, spring means fixed on said plate, said spring means bearing against said ruler and urging said ruler against said pin laterally of said pin, said spring means comprising a bracket having a substantially flat surface extending laterally of the longitudinal axis of said ruler and bearing against said ruler, said ruler having a series of spaced openings positioned adjacent the first mentioned opening in said ruler and forming a row of openings extending laterally of the longitudinal axis of said ruler, said openings being interconnected by a series of channels with said channels being of a width less than the diameter of said openings in said ruler, said center pin having a body of a size complementary to said openings in said ruler and normally being received in said ruler and said plate with said body being within one of said openings in said ruler, said pin having a reduced portion in said body of a size complementary to said channels, said pin being slidable in said plate outwardly thereof to align said reduced portion with said channel, said reduced portion being normally positioned laterally to one side of said channels and said openings when said pin is in normal position in said plate.

4. A drawing instrument comprising a plate, a ruler mounted on said plate, a center pin slidably received in said ruler and in said plate, said center pin being removable from said plate through sliding movement with respect to said plate outwardly thereof, said pin having a head, a spring mounted on said center pin, said spring bearing against said head and said ruler and urging said ruler against said plate and urging sliding movement of said pin in said ruler and said plate, said pin having resilient members connected thereto and bearing against said plate, said resilient members being compressible for sliding movement of said pin outwardly of said ruler and said plate, said resilient members resiliently resisting the latter movement.

5. A drawing instrument comprising a plate, a ruler mounted on said plate, a center pin slidably received in said ruler and in said plate, said pin having a head, a spring mounted on said center pin and bearing against said head and said ruler to urge said ruler against said plate, said pin having a cylindrical groove, a resilient member positioned in said groove and resiliently bearing against said plate, said resilient member being deformable for sliding movement of said pin outwardly of said ruler and said plate, said resilient member normally resiliently resisting the latter movement.

(References on following page)

References Cited in the file of this patent

UNITED STATES PATENTS

| | | |
|---|---|---|
| 328,668 | Gooding | Oct. 20, 1885 |
| 700,304 | Coombs | May 20, 1902 |
| 1,266,010 | Golden | May 14, 1918 |
| 1,500,314 | Hacheney | July 8, 1924 |
| 2,054,503 | Jambura | Sept. 15, 1936 |
| 2,278,440 | Graves | Apr. 7, 1942 |
| 2,384,071 | Boyer | Sept. 4, 1945 |
| 2,542,537 | Klemm | Feb. 20, 1951 |
| 2,603,877 | Gentz | July 22, 1952 |
| 2,614,329 | Almorth | Oct. 21, 1952 |
| 2,708,972 | Park | May 24, 1955 |

FOREIGN PATENTS

| | | |
|---|---|---|
| 86,865 | Switzerland | Mar. 16, 1921 |
| 48,485 | France | Nov. 29, 1937 |
| 402,996 | Italy | Mar. 31, 1943 |
| 642,813 | England | Sept. 13, 1950 |